US011173865B2

(12) United States Patent
Ito et al.

(10) Patent No.: US 11,173,865 B2
(45) Date of Patent: Nov. 16, 2021

(54) AIRBAG SYSTEM

(71) Applicant: HONDA MOTOR CO., LTD., Tokyo (JP)

(72) Inventors: Hiroyuki Ito, Wako (JP); Takashi Saso, Wako (JP); Takayuki Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/718,266

(22) Filed: Dec. 18, 2019

(65) Prior Publication Data

US 2020/0238942 A1 Jul. 30, 2020

(30) Foreign Application Priority Data

Jan. 24, 2019 (JP) .............................. JP2019-010483

(51) Int. Cl.
*B60R 21/232* (2011.01)
*B60R 21/205* (2011.01)
*B60R 21/02* (2006.01)

(52) U.S. Cl.
CPC .......... *B60R 21/232* (2013.01); *B60R 21/205* (2013.01); *B60R 2021/022* (2013.01); *B60R 2021/0273* (2013.01)

(58) Field of Classification Search
CPC ................ B60R 21/232; B60R 21/205; B60R 2021/0273; B60R 2021/022; B60R 2021/23107; B60R 2021/23161; B60R 21/231; B60R 21/203; B60R 21/23; B60R 21/2334
See application file for complete search history.

(56) References Cited

U.S. PATENT DOCUMENTS

| 5,172,790 A * | 12/1992 | Ishikawa ................. B60R 21/20 180/268 |
| 9,566,929 B1* | 2/2017 | Belwafa ............ B60R 21/23138 |
| 2007/0126217 A1* | 6/2007 | Nayef ................... B60R 21/205 280/732 |
| 2010/0264631 A1* | 10/2010 | Tomitaka .............. B60R 21/231 280/730.2 |
| 2011/0074141 A1* | 3/2011 | Wipasuramonton ........................ B60R 21/2342 280/736 |

(Continued)

FOREIGN PATENT DOCUMENTS

JP      2004-291785      10/2004

*Primary Examiner* — Drew J Brown
(74) *Attorney, Agent, or Firm* — Amin, Turocy & Watson, LLP

(57) ABSTRACT

An airbag system includes a front airbag device that is provided in front of an occupant and that includes a front bag body configured to be deployed by being inflated by a gas being supplied during input of an impact, a door-side guide device that is provided on a door, and that includes a door-side guide member which displaces laterally toward the occupant from an inner side surface of the door during input of the impact and which is configured to guide the occupant toward the front bag body in front, and a console-side guide device provided on a console, and that includes a console-side guide member which displaces upward from an upper surface of the console during input of the impact and which is configured to guide the occupant toward the front bag body in front.

6 Claims, 4 Drawing Sheets

(56) References Cited

U.S. PATENT DOCUMENTS

| | | | |
|---|---|---|---|
| 2011/0278826 A1* | 11/2011 | Fukawatase | B60R 21/231 |
| | | | 280/730.2 |
| 2014/0042733 A1* | 2/2014 | Fukawatase | B60R 21/0136 |
| | | | 280/730.2 |
| 2015/0061268 A1* | 3/2015 | Nagasawa | B60R 21/231 |
| | | | 280/730.1 |
| 2016/0159312 A1* | 6/2016 | Sato | B60R 21/233 |
| | | | 280/729 |
| 2017/0015270 A1* | 1/2017 | Ohno | B60R 21/233 |
| 2018/0065581 A1* | 3/2018 | Ohno | B60R 21/231 |
| 2018/0334130 A1* | 11/2018 | Mihm | B60R 21/16 |
| 2018/0370472 A1* | 12/2018 | Belwafa | B60R 21/0136 |
| 2019/0023213 A1* | 1/2019 | Faruque | B60R 21/207 |
| 2019/0337479 A1* | 11/2019 | Hill | B60R 21/01512 |

\* cited by examiner

AIRBAG SYSTEM

CROSS-REFERENCE TO RELATED APPLICATION

Priority is claimed on Japanese Patent Application No. 2019-010483, filed Jan. 24, 2019, the content of which is incorporated herein by reference.

BACKGROUND OF THE INVENTION

Field of the Invention

The present invention relates to an airbag system.

Description of Related Art

In the related art, an airbag device configured to deploy a bag body when an impact is input to a vehicle is known.

Such an airbag device protects the body of an occupant by receiving a part of the body of the occupant using the inflated and deployed bag body. For this reason, there is a need to receive the body of the occupant displaced by the impact using the bag body. However, the body of the occupant may not be sufficiently received by the bag body due to various reasons.

For example, Japanese Unexamined Patent Application, First Publication No. 2004-291785 discloses a configuration in which an airbag deployed by being inflated between a body-side section of a vehicle and an occupant who is sitting on a seat is provided. In the configuration, when a lumbar region of an occupant is biased toward a side door, the airbag is deployed by being inflated between the body-side section and the lumbar region of the occupant by pushing up the buttock of the occupant at the side of the body-side section. In the configuration, the deployment of the airbag is not hindered by the body of the occupant, and the airbag is capable to be reliably deployed in order to receive the body of the occupant.

SUMMARY OF THE INVENTION

Incidentally, an airbag device may have a bag body installed in a steering wheel provided in front of a driver's seat or a console in front of an assistant driver's seat. Such an airbag device receives an upper body of an occupant using the bag body deployed from the steering wheel or the console and inflated upon a collision of the vehicle.

However, when a collision direction of the vehicle is inclined in a leftward/rightward direction with respect to a forward/rearward direction, the body of the occupant may be displaced in a direction deviated from the bag body.

Also even in this case, it is desired to receive the body of the occupant using the bag body provided in front and minimize an impact applied to the occupant.

An aspect of the present invention is directed to providing an airbag system capable of sufficiently receiving the body of an occupant with respect to impacts input from various directions.

(1) An airbag system according to an aspect of the present invention includes a front airbag device that is provided in front of an occupant who is sitting on a vehicle seat and that includes a front bag body which is configured to be deployed by being inflated by a gas being supplied during input of an impact; a door-side guide device that is provided on a door disposed on one side of the vehicle seat in a widthwise direction, and that includes a door-side guide member which displaces laterally toward the occupant from an inner side surface of the door during input of the impact and which is configured to guide the occupant toward the front bag body in front; and a console-side guide device that is provided on a console disposed on other side of the vehicle seat in the widthwise direction, and that includes a console-side guide member which displaces upward from an upper surface of the console during input of the impact and which is configured to guide the occupant toward the front bag body in front.

(2) In the aspect of the above-mentioned (1), the door-side guide member may be a door-side bag body that is configured to be deployed by being inflated toward the occupant at a side by a gas being supplied during input of an impact.

(3) In the aspect of the above-mentioned (2), the door-side bag body may be formed such that a protrusion dimension from the door gradually increases forward.

(4) In the aspect of the above-mentioned (3), a front end portion of the door-side bag body may be disposed closer to the door than a center of the front bag body in a widthwise direction.

(5) In the aspect of any one of the above-mentioned (1) to (4), the console-side guide member may be a console-side bag body that is configured to be deployed by being inflated upward by a gas being supplied during input of an impact.

(6) In the aspect of the above-mentioned (5), the console may have an article accommodating section configured to accommodate an article, and the console-side bag body may be provided at a position that avoids the article accommodating section when seen in a plan view.

According to the aspect of the above-mentioned (1), an occupant who is sitting on the vehicle seat is guided so as to be displaced toward the front bag body during input of an impact due to the door-side guide member provided on the door on one side of the vehicle seat in the widthwise direction and the console-side guide member provided on the console on the other side of vehicle seat in the widthwise direction. Accordingly, the body of the occupant can be reliably received by the front bag body of the front airbag device with respect to inputs of impacts from various directions.

According to the aspect of the above-mentioned (2), since the door-side bag body is provided as the door-side guide member, when the body of the occupant is displaced toward the door-side bag body by the impact, it is possible to receive the load of the occupant using the door-side bag body and minimize the impact applied to the body of the occupant.

According to the aspect of the above-mentioned (3), since the door-side bag body is formed such that the protrusion dimension from the side of the door gradually increases forward, the body of the occupant displaced forward can be reliably guided toward the front bag body.

According to the aspect of the above-mentioned (4), since the front end portion of the door-side bag body is disposed closer to the door than the center of the front bag body in the widthwise direction, the body of the occupant displaced forward can be guided toward the center of the front bag body in the widthwise direction.

According to the aspect of the above-mentioned (5), since the console-side bag body is provided as the console-side guide member, when the occupant is displaced toward the console by the impact, it is possible to receive the load of the occupant using the console-side bag body and minimize the impact applied to the body of the occupant.

According to the aspect of the above-mentioned (6), since the console-side bag body is disposed at a position that avoids the article accommodating section when seen in a plan view, the article accommodating section can be prevented from interfering with the console-side bag body when the console-side bag body is deployed by being inflated.

DETAILED DESCRIPTION OF THE INVENTION

Figure 1:
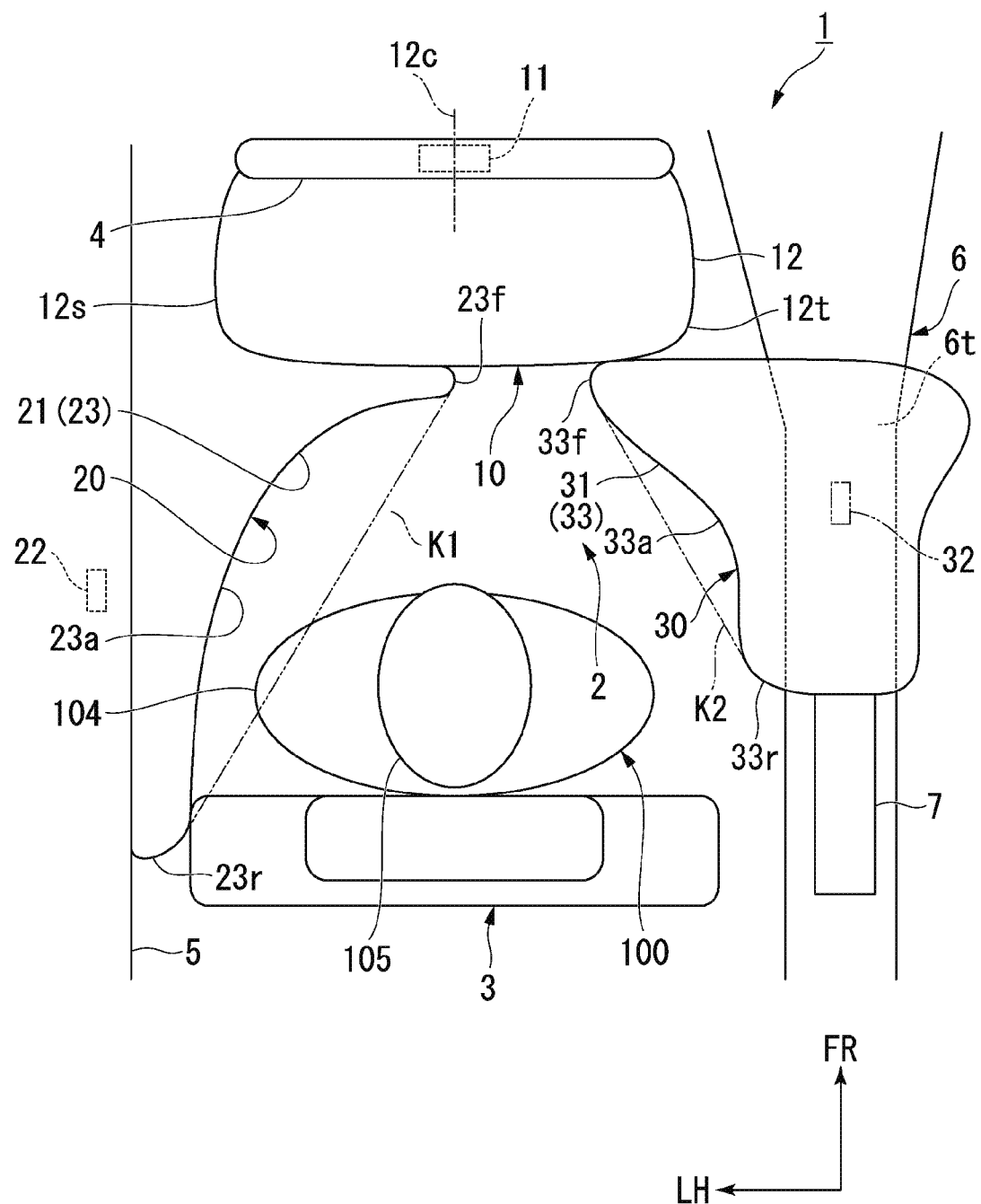
FIG. 1 is a plan view showing a part of a vehicle on which an airbag system to which an embodiment of the present invention is applied is mounted.

Hereinafter, an embodiment of the present invention will be described with reference to the accompanying drawings. Further, in the drawings used in the following description, an arrow FR indicates a forward direction with respect to a vehicle, an arrow UP indicates an upward direction with respect to the vehicle, and an arrow LH indicates a leftward direction with respect to the vehicle.

Figure 2:
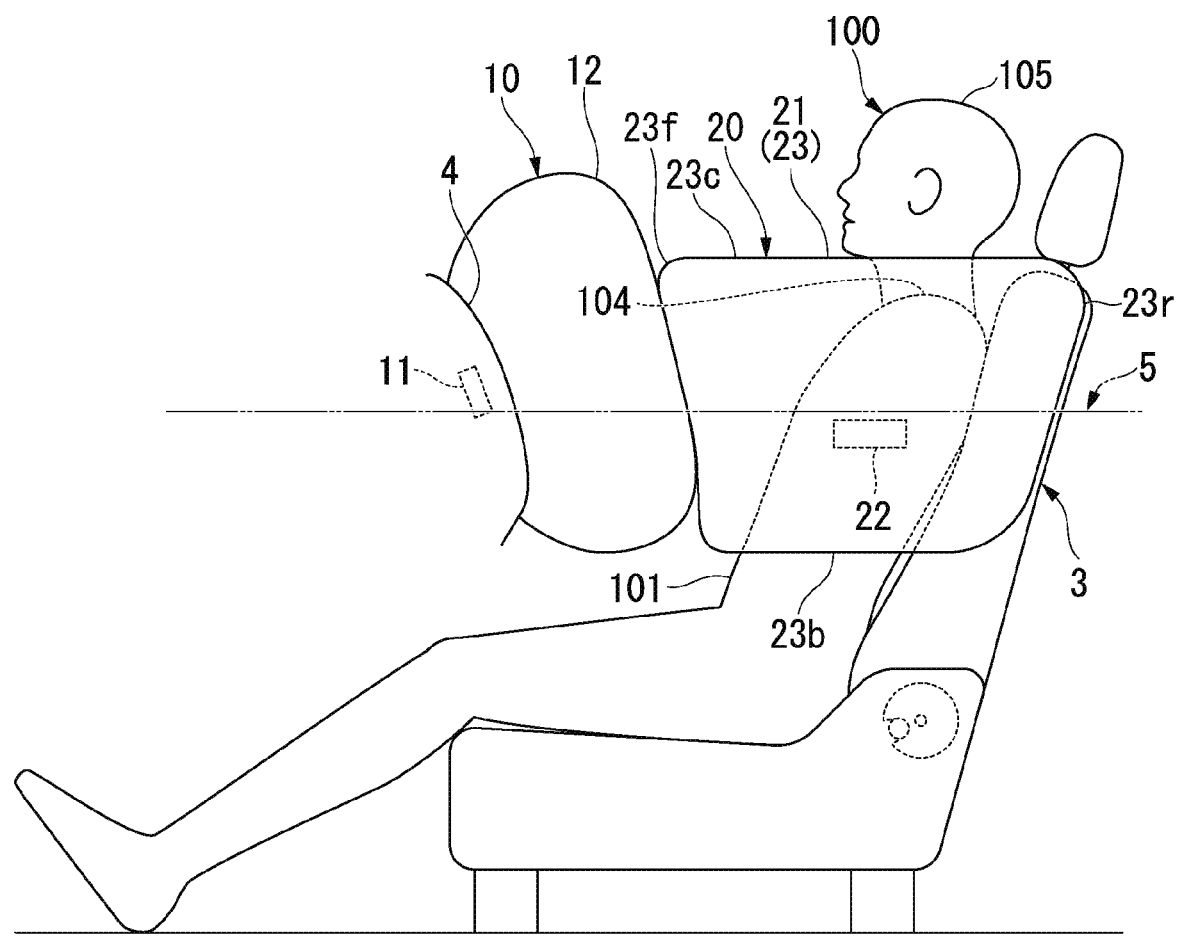
FIG. 2 is a side view showing a door-side guide device that constitutes the airbag system.
Figure 3:
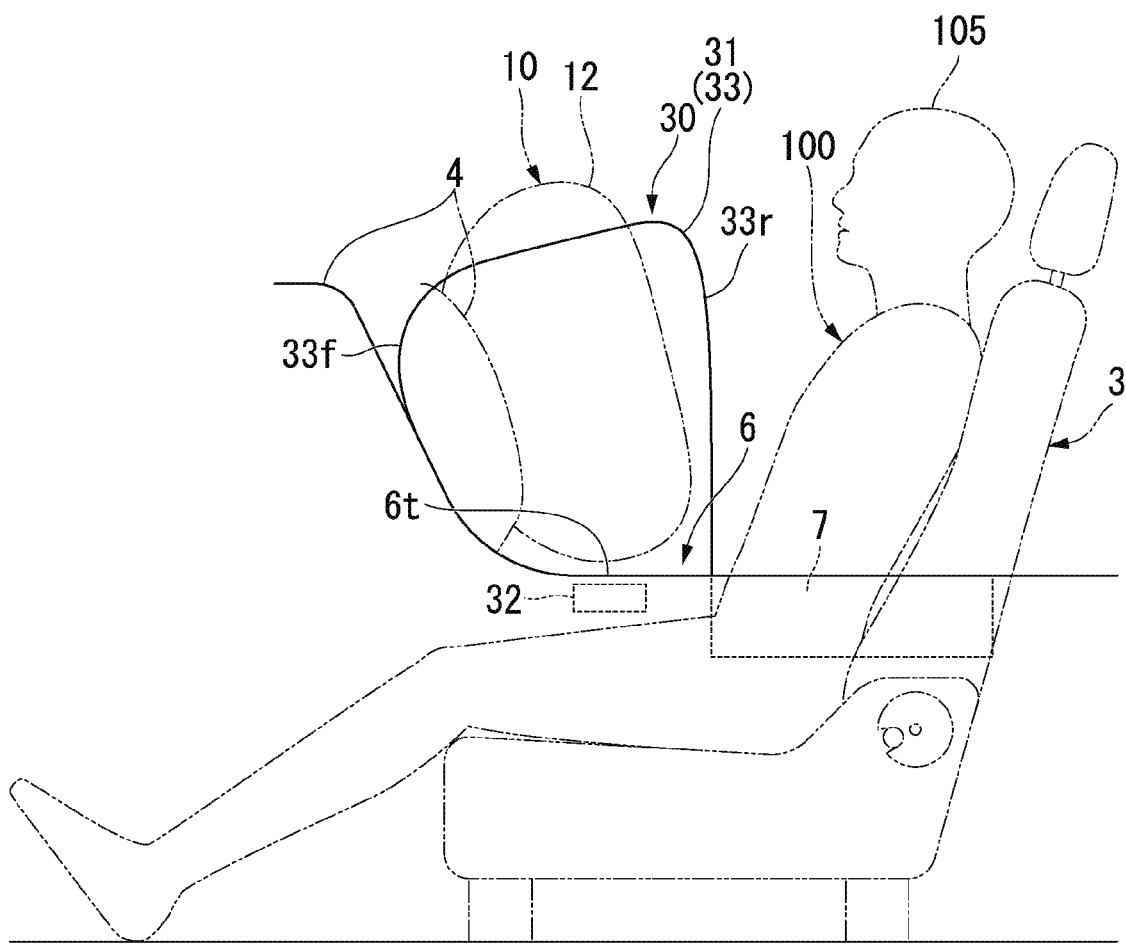
FIG. 3 is a side view showing a console-side guide device that constitutes the airbag system.

FIG. 1 is a plan view showing a part of the vehicle in which an airbag system to which an embodiment of the present invention is applied is mounted. FIG. 2 is a side view showing a door-side guide device that constitutes the airbag system. FIG. 3 is a side view showing a console-side guide device that constitutes the airbag system.

As shown in FIG. 1, a vehicle 1 includes an airbag system 2 in a passenger compartment. The airbag system 2 includes a front airbag device 10 provided in a steering wheel or a front console 4, a door-side guide device 20 provided on a door 5 of the vehicle 1, and a console-side guide device 30 provided on a center console 6.

As shown in FIG. 1 and FIG. 2, the steering wheel and the front console 4 are provided forward in the vehicle 1 with respect to a vehicle seat 3, on which an occupant 100 sits in front. The front airbag device 10 includes an inflator 11 and a front bag body 12.

The inflator 11 generates a high pressure gas in a case an impact to the vehicle is input. The inflator 11 is installed in the steering wheel or the front console 4.

The front bag body 12 is accommodated in the steering wheel or the front console 4, for example, in a state being folded or wound, and receives supply of a gas from the inflator 11 to be deployed by being inflated from the steering wheel or the front console 4 toward the rear of the vehicle 1.

The door 5 on which the door-side guide device 20 is provided is provided on one side with respect to the vehicle seat 3 on which the occupant 100 sits in a widthwise direction of the vehicle seat 3 (a leftward/rightward direction of the vehicle 1). The "one side" is an outer side of the vehicle 1 in the leftward/rightward direction (an outer side in the vehicle width direction). The "one side" indicates a left side when the seat is the left seat among the left and right seats and a right side when the seat is the right seat among the left and right seats. For the convenience of illustration, in the embodiment, the left seat is shown.

The door-side guide device 20 includes an inflator 22 and a door-side guide member 21.

The inflator 22 generates a high pressure gas upon an impact being input to the vehicle. The inflator 22 is installed in the door 5.

As shown in FIG. 1, the door-side guide member 21 is displaced laterally from an inner side surface of the door 5 toward the occupant 100 at the time an impact is input, and guides the occupant 100 toward the front bag body 12 in front. In the embodiment, a door-side bag body 23 is provided as the door-side guide member 21. The door-side bag body 23 is accommodated in the door 5, for example, while being folded or wound, and receives supply of a gas from the inflator 22 to be deployed by being inflated laterally from an inner side surface of the door 5 toward the occupant 100.

Hereinafter, a shape of the inflated and deployed door-side bag body 23 when seen in a plan view will be described.

The door-side bag body 23 is formed such that a protrusion dimension from the inner side surface of the door 5 toward an inner side of the vehicle 1 in the widthwise direction (a central side in the widthwise direction) gradually increases from the rear toward the front when seen in a plan view. In the embodiment, the door-side bag body 23 is provided such that an inner side surface 23a directed inward in the vehicle width direction gradually extends inward in the vehicle width direction from the rear toward the front. Further, the inner side surface 23a of the door-side bag body 23 is curved in an arch shape to protrude forward and outward in the vehicle width direction with respect to a virtual line K1 that linearly connects a front end portion 23f and a rear end portion 23r of the door-side bag body 23.

The front end portion 23f of the door-side bag body 23 is disposed behind the front bag body 12. Further, the front end portion 23f of the door-side bag body 23 is disposed closer to the door 5 on an outer side in the vehicle width direction than a center 12c of the front bag body 12 in the widthwise direction. The front end portion 23f of the door-side bag body 23 is disposed closer to the center 12c than an outer side portion 12s which is outside the front bag body 12 in the vehicle width direction. That is, the front end portion 23f of the door-side bag body 23 is provided so as to overlap the front bag body 12 when seen from the rear. In addition, the rear end portion 23r of the door-side bag body 23 is disposed behind the shoulder 104 of the occupant 100 who is sitting on the vehicle seat 3.

As shown in FIG. 2, a lower end portion 23b of the door-side bag body 23 is preferably disposed below at least the shoulder 104 of the occupant 100. In addition, an upper end portion 23c of the door-side bag body 23 is preferably disposed above the shoulder 104 of the occupant 100 and more preferably disposed above the head 105 of the occupant 100.

The door-side bag body 23 receives the body (the torso 101 or the head 105) of the occupant 100 when the occupant 100 is displaced forward diagonally while being inclined toward the door 5 in the leftward/rightward direction with respect to the forward/rearward direction during input of an impact to the vehicle. Further, the body of the occupant 100 is guided toward the front bag body 12 in front of the seat by displacing the body of the occupant 100 forward along the inner side surface 23a.

As shown in FIG. 1 and FIG. 3, the center console 6 on which the console-side guide device 30 is provided is provided on the other side of the vehicle seat 3 in the widthwise direction with respect to the vehicle seat 3 on which the occupant 100 sits. "The other side" is an inner side of the vehicle 1 in the leftward/rightward direction (an inner side in the vehicle width direction, a central side in the vehicle width direction). "The other side" indicates a right side when the seat is the left seat among the left and right seats and a left side when the seat is the right seat among the left and right seats.

The center console 6 is provided between the two vehicle seats 3 provided next to each other in the leftward/rightward direction in the vehicle 1. The center console 6 extends in the forward/rearward direction. An article accommodating section 7 having an accommodating space in which articles can be accommodated is provided in a rear section of the center console 6. The article accommodating section 7 may function as an armrest by including a lid or the like. For example, an upper surface 6t of the center console 6 is formed to gradually become higher further forward in front of the article accommodating section 7 or a shift lever (not shown), and formed to be continuous with the front console 4.

The console-side guide device 30 includes an inflator 32 and a console-side guide member 31.

The inflator 32 generates a high pressure gas during input of an impact to the vehicle. The inflator 32 is installed in the center console 6.

The console-side guide member 31 is displaced upward from the upper surface 6t of the center console 6 during input of the impact, and guides the occupant 100 toward the front bag body 12 in front. In the embodiment, a console-side bag body 33 is provided as the console-side guide member 31. The console-side bag body 33 is accommodated in the center console 6, for example, in a state being folded and wound, and receives supply of the gas from the inflator 32, and is deployed by being inflated so as to be raised upward from the upper surface 6t of the center console 6.

Hereinafter, a shape of the inflated and deployed console-side bag body 33 when seen in a plan view will be described.

As shown in FIG. 1, the console-side bag body 33 covers at least the center console 6 from above when seen in a plan view. The console-side bag body 33 is formed such that a protrusion dimension from the center console 6 toward the vehicle seat 3 (an outer side in the vehicle width direction) gradually increases from the rear toward the front. In the embodiment, the console-side bag body 33 is provided such that an outer side surface 33a directed outward in the vehicle width direction gradually extends outward in the vehicle width direction from the rear toward the front. Further, the outer side surface 33a of the console-side bag body 33 is curved in an arch shape so as to protrude forward and inward in the vehicle width direction with respect to a virtual line K2 that linearly connects a front end portion 33f and a rear end portion 33r of the console-side bag body 33.

The front end portion 33f of the console-side bag body 33 is disposed behind the front bag body 12. Further, the front end portion 33f of the console-side bag body 33 is disposed closer to the center console 6 on a central side in the vehicle width direction than the center 12c of the front bag body 12 in the widthwise direction. The front end portion 33f of the console-side bag body 33 is disposed closer to the center 12c than an inner side portion 12t of the front bag body 12 on a central side in the vehicle width direction. That is, the front end portion 33f of the console-side bag body 33 is provided so as to overlap the front bag body 12 when seen from the rear.

The console-side bag body 33 is provided at a position different from the article accommodating section 7 (a position that avoids the article accommodating section 7) when seen in a plan view. Specifically, the console-side bag body 33 is provided in front of the article accommodating section 7.

The console-side bag body 33 receives the body of the occupant 100 (the torso 101 or the head 105) when the occupant 100 is displaced forward diagonally while being inclined toward the center console 6 in the leftward/rightward direction with respect to the forward/rearward direction during input of an impact to the vehicle. Further, the body of the occupant 100 is guided toward the front bag body 12 in front of the seat by displacing the body of the occupant 100 forward along the outer side surface 33a.

Hereinafter, an operation of the airbag system 2 will be described.

When an impact is input to the vehicle 1 and the input impact is equal to or larger than a predetermined strength, the inflator 11 of the front airbag device 10, the inflator 22 of the door-side guide device 20 and the inflator 32 of the console-side guide device 30 generate a high pressure gas. When the gas is generated from the inflator 11, the front bag body 12 of the front airbag device 10 is deployed by being inflated by receiving supply of the gas. When the gas is generated from the inflator 22, the door-side bag body 23 of the door-side guide device 20 is deployed by being inflated by receiving supply of the gas. When the gas is generated from the inflator 32, the console-side bag body 33 of the console-side guide device 30 is deployed by being inflated by receiving supply of the gas.

When the door-side bag body 23 and the console-side bag body 33 are deployed by being inflated, the door-side bag body 23 and the console-side bag body 33 are disposed so as to overlap left and right side portions of the front bag body 12, respectively. Accordingly, the body of the occupant 100 is guided toward the front bag body 12 along the inner side surface 23a of the door-side bag body 23 and the outer side surface 33a of the console-side bag body 33. For this reason, even when a direction of the impact input to the vehicle 1 is inclined in the leftward/rightward direction with respect to the forward/rearward direction, the occupant 100 who is sitting on the vehicle seat 3 is guided toward the front bag body 12 in front of the seat. Accordingly, the body of the occupant 100 is reliably received by the front bag body 12.

Accordingly, an operation of the airbag system 2 is terminated.

As described above, in the embodiment, the occupant 100 who is sitting on the vehicle seat 3 is guided so as to be displaced toward the front bag body 12 during input of an impact due to the door-side guide device 20 provided on the door 5 on one side of the vehicle seat 3 in the widthwise direction and the console-side guide device 30 provided on the center console 6 on the other side of the vehicle seat 3 in the widthwise direction. In addition, when the body of the occupant contacts the door-side bag body 23 of the door-side guide device 20, the door-side bag body 23 is also supported by a reaction force from the door. Accordingly, it is possible to reliably receive the body of the occupant 100 using the front bag body 12 of the front airbag device 10 with respect to inputs of impacts from various directions.

In addition, since the door-side bag body 23 is provided as the door-side guide member 21, when the body of the occupant 100 is displaced toward the door-side bag body 23 by the impact, it is possible to receive the load of the occupant 100 using the door-side bag body 23 and minimize the impact applied to the body of the occupant 100.

In addition, since the door-side bag body 23 is formed such that a protrusion dimension from the side of the door 5 gradually increases forward, the body of the occupant 100 displaced forward can be reliably guided toward the front bag body 12.

In addition, since the front end portion 23f of the door-side bag body 23 is disposed closer to the door 5 than the center 12c of the front bag body 12 in the widthwise direction, the body of the occupant 100 displaced forward can be guided toward the center 12c of the front bag body 12 in the widthwise direction.

In addition, since the console-side bag body 33 is provided as the console-side guide member 31, when the occupant 100 is displaced toward the center console 6 by the impact, it is possible to receive the load of the occupant 100 using the console-side bag body 33 and minimize the impact applied to the body of the occupant 100.

In addition, since the console-side bag body 33 is provided at a position that avoids the article accommodating section 7 when seen in a plan view, the article accommodating section 7 can be prevented from interfering with the console-side bag body 33 when the console-side bag body 33 is deployed by being inflated.

Further, the present invention is not limited to the above-mentioned embodiment described with reference to the drawings, various variants are considered without departing from the technical scope of the present invention.

For example, while the door-side bag body 23 may be provided as the door-side guide member 21, there is no limitation thereto. For example, an interior member that forms a surface of the door 5 on an interior side may be used as the door-side guide member 21, and the interior member may be displaced laterally toward the occupant 100 from the inner side surface of the door 5 during input of the impact by the airbag, a cylinder mechanism, or the like.

In addition, while the console-side bag body 33 may be provided as the console-side guide member 31, there is no limitation thereto. For example, the center console 6 itself may be displaced upward or the like during input of the impact as the console-side guide member 31.

Figure 4:
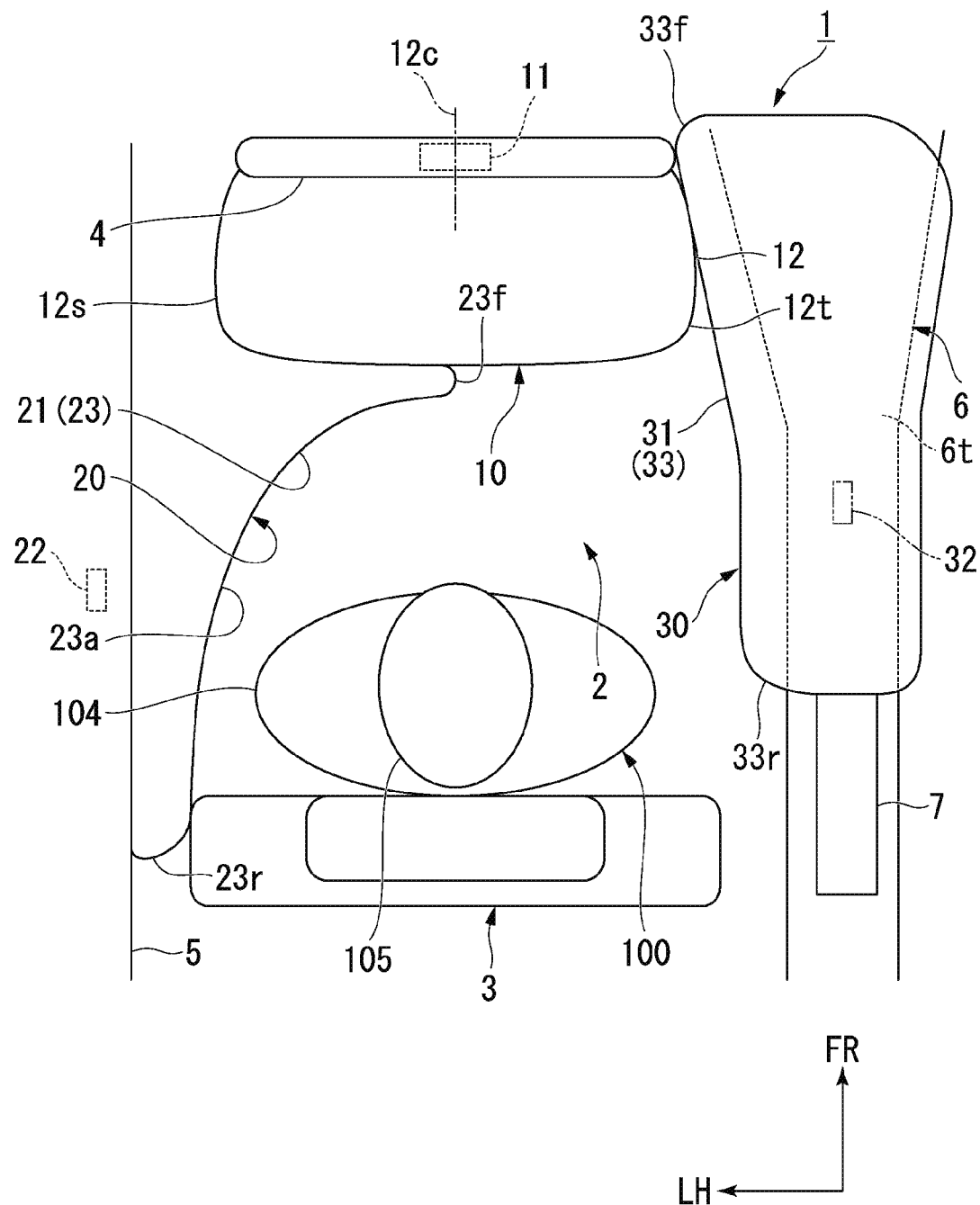
FIG. 4 is a side view showing a variant of the console-side guide device that constitutes the airbag system.

In addition, in the embodiment, while the front end portion 23f of the door-side bag body 23 and the front end portion 33f of the console-side bag body 33 are disposed at a position behind the front bag body 12 and are provided so as to overlap the front bag body 12 when seen from behind, respectively, there is no limitation thereto. For example, as shown in FIG. 4, the front end portion 33f of the console-side bag body 33 may be provided so as to extend forward while passing a side portion of the front bag body 12 and may be disposed on the front console 4. Similarly, the front end portion 23f of the door-side bag body 23 may extend forward while passing the side portion of the front bag body 12.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An airbag system comprising:
 a front airbag device that is provided in front of an occupant who is sitting on a vehicle seat and that includes a front bag body which is configured to be deployed by being inflated by a gas being supplied during input of an impact;
 a door-side bag body that is provided on a door disposed on one side of the vehicle seat in a widthwise direction, that displaces laterally toward the occupant from an inner side surface of the door during input of the impact and that is configured to guide the occupant toward the front bag body in front; and
 a console-side bag body that is provided on a console disposed on other side of the vehicle seat in the widthwise direction, that displaces upward from an upper surface of the console during input of the impact and that is configured to guide the occupant toward the front bag body in front,
 wherein a protrusion dimension of a front end portion at an inner side surface of the door-side bag body from the door is formed larger than a protrusion dimension of a rear end portion at the inner side surface of the door-side bag body from the door,
 wherein a protrusion dimension of a front end portion at an outer side surface of the console-side bag body from the console is formed larger than a protrusion dimension of a rear end portion at the outer side surface of the console-side bag body from the console,
 the inner side surface has a shape protruding outward in a vehicle width direction with respect to a virtual line that linearly connects the front end portion of the inner side surface and the rear end portion of the inner side surface, and
 the outer side surface has a shape protruding inward in the vehicle width direction with respect to a virtual line that linearly connects the front end portion of the outer side surface and the rear end portion of the outer side surface.

2. The airbag system according to claim 1, wherein the door-side bag body is formed such that a protrusion dimension from the door gradually increases forward.

3. The airbag system according to claim 2, wherein a front end portion of the door-side bag body is disposed closer to the door than a center of the front bag body in a widthwise direction.

4. The airbag system according to claim 1, wherein the console has an article accommodating section configured to accommodate an article, and the console-side bag body is provided at a position that avoids the article accommodating section when seen in a plan view.

5. The airbag system according to claim 1, wherein the front end portion at the inner side surface of the door-side bag body is provided so as to overlap the front bag body when seen from a rear.

6. The airbag system according to claim 5, wherein the front end portion at the outer side surface of the console-side bag body is provided so as to overlap the front bag body when seen from the rear.

* * * * *